United States Patent [19]
Mayeda

[11] Patent Number: 4,786,204
[45] Date of Patent: Nov. 22, 1988

[54] CLAMPING APPARATUS WITH BI-DIRECTIONAL CLAMPING DEVICE

[75] Inventor: Bruce H. Mayeda, Longmont, Colo.

[73] Assignee: The Eversman Mfg. Company, Denver, Colo.

[21] Appl. No.: 832,333

[22] Filed: Feb. 24, 1986

[51] Int. Cl.⁴ .................. F16B 2/18; F16B 7/04; A01B 63/04
[52] U.S. Cl. ........................... 403/374; 172/744; 172/751; 172/763; 403/385; 403/398; 403/DIG. 8; 411/398
[58] Field of Search ............ 172/749, 751, 741, 744, 172/763; 403/188, 323, 374, 385, 391, 398, 399, 400, DIG. 8, 3, 4, 409.1; 411/238, 398

[56] References Cited

U.S. PATENT DOCUMENTS

| | | | |
|---|---|---|---|
| 1,562,391 | 11/1925 | Vidon | 403/399 |
| 1,671,664 | 5/1928 | Baxter | 403/188 |
| 2,219,969 | 10/1940 | Vaughan | 403/398 |
| 3,756,327 | 9/1973 | Orthman | 403/385 X |
| 3,919,952 | 11/1975 | Lund | 411/398 X |

FOREIGN PATENT DOCUMENTS

| | | | |
|---|---|---|---|
| 1169235 | 9/1958 | France | 403/DIG. 8 |
| 353910 | 11/1937 | Italy | 403/400 |

Primary Examiner—Richard T. Stouffer
Attorney, Agent, or Firm—Fields, Lewis, Pittenger & Rost

[57] ABSTRACT

A clamping device for exerting clamping forces in two directions to a shank between a pair of spaced clamping members having a transverse stop. The device includes an elongated bolt like body having a pair of axially spaced sections, a head at one end and external threads on an opposite end portion with a nut on the threads for applying a first clamping force to the spaced members. An eccentric section between the shaft sections applies a transverse clamping force to the shank. A pair of flat plates forming the clamping members has two spaced clamping devices and is arranged to slidably clamp to a variety of movable supports. A pair of spaced clamping plates are affixed to the end of a longitudinal frame with the option of a shim to accomodate shanks of smaller sizes.

15 Claims, 3 Drawing Sheets

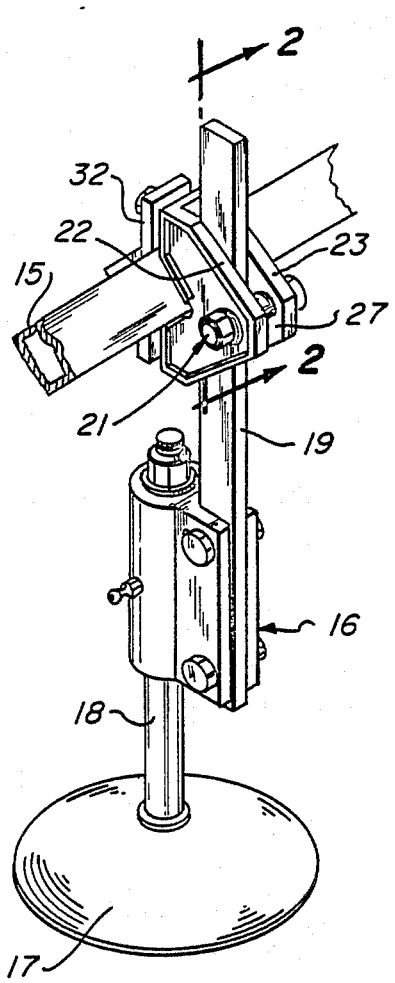
Fig_1
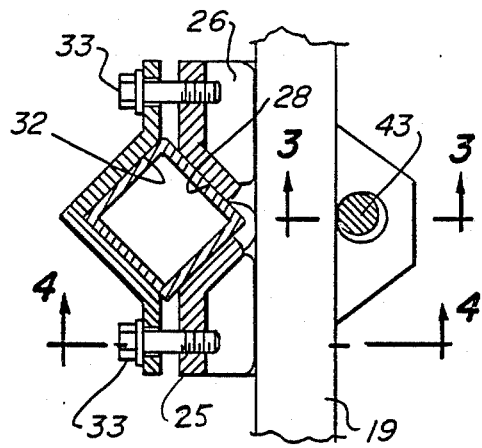
Fig_2
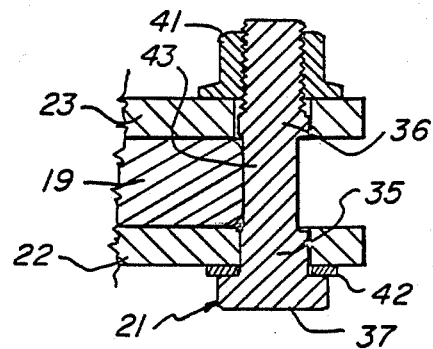
Fig_3
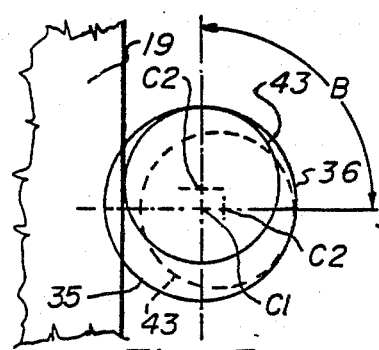
Fig_5
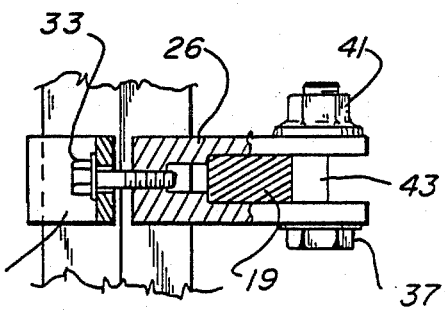
Fig_4

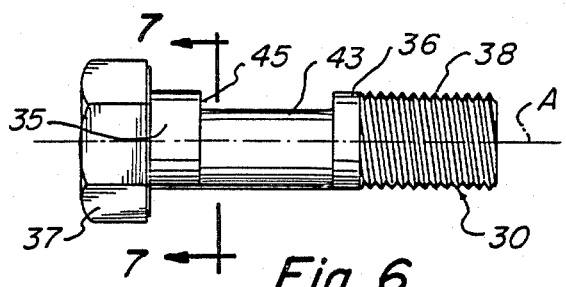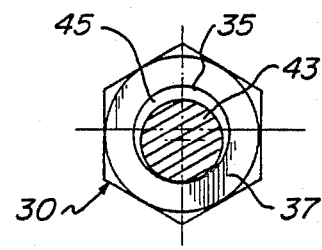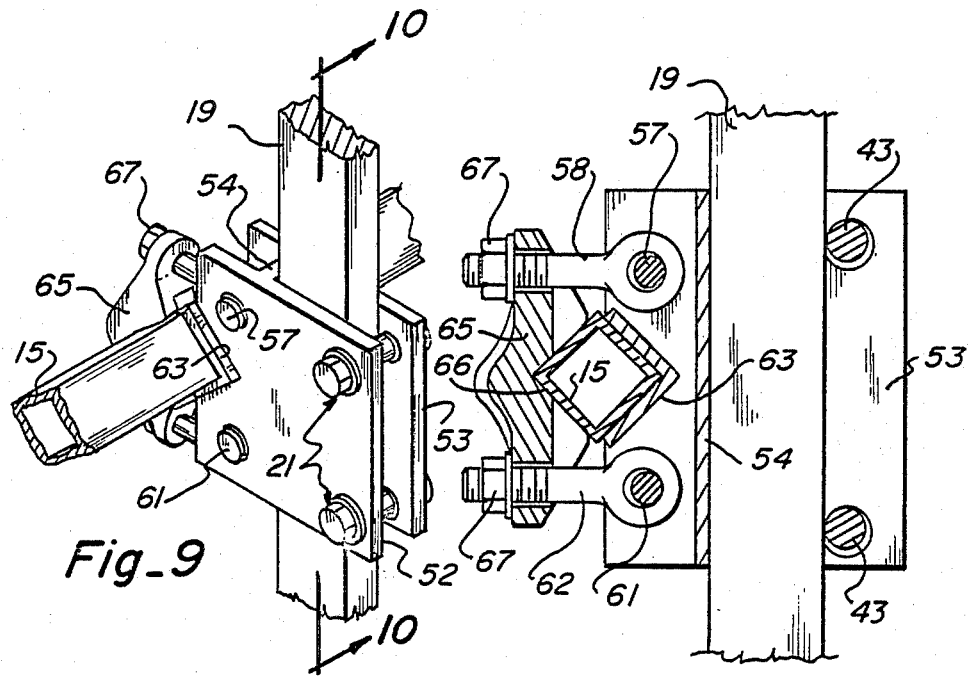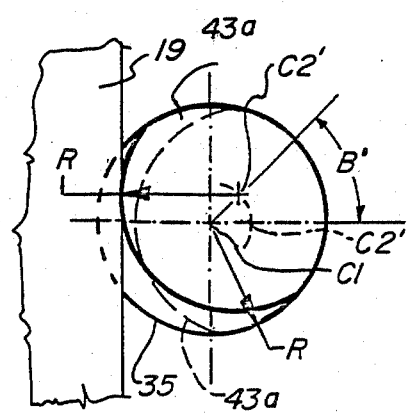

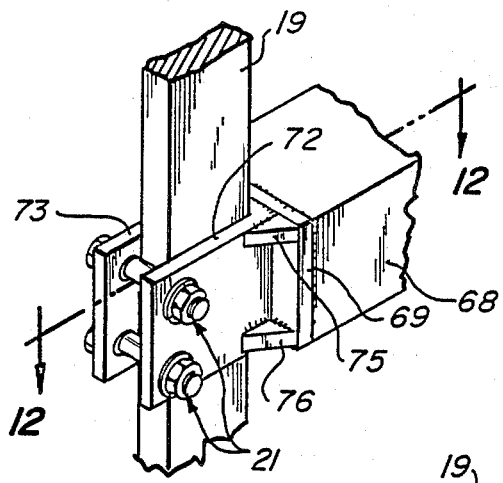
Fig_11
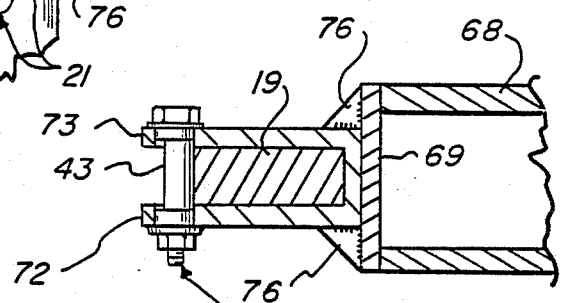
Fig_12
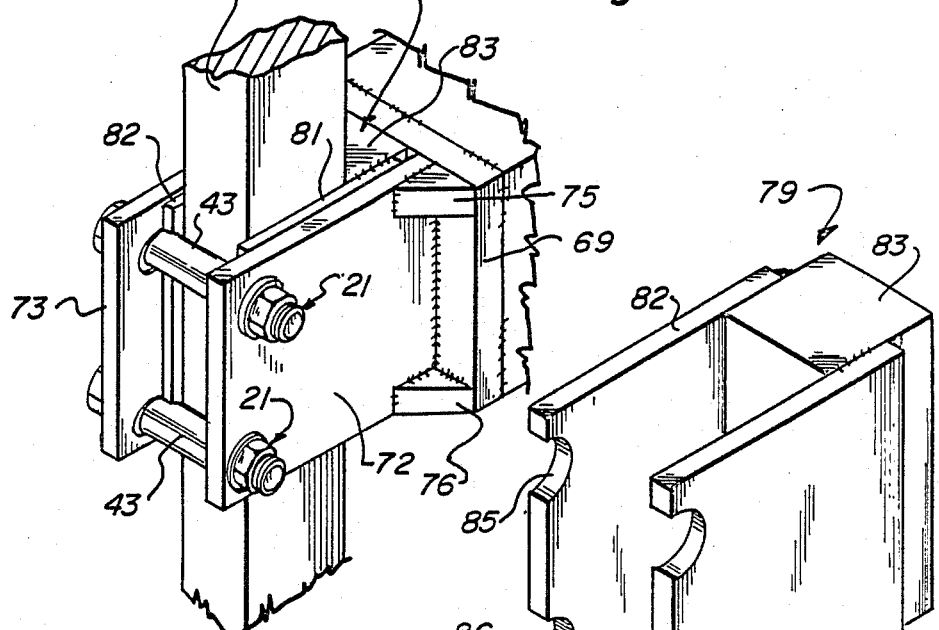
Fig_13
Fig_14

CLAMPING APPARATUS WITH BI-DIRECTIONAL CLAMPING DEVICE

TECHNICAL FIELD

This invention relates to a novel and improved clamping apparatus that is particularly suitable for clamping an agricultural tool to a movable support.

BACKGROUND ART

A variety of different types of clamping devices have been used in agricultural applications to connect an agricultural tool to a movable support. The tool bar clamp is a common type of clamp presently in use. A typical tool bar clamp is shown and described in a copending application U.S. Ser. No. 643,879, now U.S. Pat. No. 4,585,073, assigned to the assignee of the present invention. Tool bar clamps generally include a clamp body with a vertical slot of rectangular shape that is open at the top and bottom and is closed along the sides and ends. The clamp body engages a tool bar and a clamp bracket and bolts extend through the bracket and into the clamp body to fasten the clamp body to the tool bar. A locking bolt extends through one end of the clamp body into the slot against the end of a tool-supporting shank to urge the shank against the opposite end wall of the clamp body. A disadvantage of this clamping arrangement is an inability to hold heat treated shanks.

Conventional bolts having a head at one end and external threads at the opposite end have been passed through the free end portions of a pair of spaced clamping members with the head and a nut threaded thereon applying clamping forces to an element between the plates. One person has difficulty in loosening these bolts and adjusting the height of the shank and tool.

Eccentric bolts having an eccentric section adjacent the head and larger in diameter than the shaft section have been used to exert clamping forces in a direction transverse to the longitudinal axis of the bolt.

U.S. Pat. No. 1,671,664 discloses an eccentric bolt supported in a U-shaped bracket to releasably clamp a shank of circular cross section to a bracket. The eccentric bolt has axially spaced shaft sections disposed along a common longitudinal axis and an eccentric or off-center section larger in size than the adjacent shaft sections supported in the bracket. The eccentric section is moved against a wedge that engages a circular tube to clamp the tube to the bracket. The clamping forces applied to the shank in this arrangement are applied from one direction only.

DISCLOSURE OF INVENTION

A clamping device disclosed includes an elongated body having axially spaced shaft sections coaxially arranged along a common longitudinal axis. The body has a head at one end and threads at an opposite end portion on which a nut is threaded for applying a first clamping force to a pair of spaced clamping members through which the body extends. An element, preferably a shank secured to an agricultural tool, is disposed between the clamping members. The body has an eccentric section between the shaft sections having a center offset from the center of the shaft sections so that in one position of rotation for the body the eccentric section applies a second clamping force to the shank transverse to the first-mentioned clamping force. Clamping members in the form of spaced plates and a transverse stop support two of the clamping devices which in turn clamp a shank within said members and stop. Removable bolts enable the spaced plates to be fastened to different sizes and shapes of transverse movable supports. Spaced clamping plates affixed to a movable longitudinal support frame and an insert shim enables shanks of different sizes to be fastened to the frame.

BRIEF DESCRIPTION OF DRAWINGS

The details of this invention will be described in connection with the accompanying drawings, in which:

FIG. 1 is a perspective view of clamping apparatus of the present invention;

FIG. 2 is a sectional view taken along lines 2—2 of FIG. 1;

FIG. 3 is a sectional view taken along lines 3—3 of FIG. 2;

FIG. 4 is a sectional view taken along lines 4—4 of FIG. 2;

FIG. 5 is an enlarged schematic view showing the eccentric section of the clamping device in the release position in dashed lines and the clamping position in full lines;

FIG. 6 is a side elevation view of a clamping device of the present invention without the nut and washer;

FIG. 7 is a sectional view taken along lines 7—7 of FIG. 6;

FIG. 8 is an enlarged schematic view of an alternative shape for the eccentric section again with the release position in dashed lines and the clamping position in full lines;

FIG. 9 is a perspective view of another form of clamping apparatus of the present invention;

FIG. 10 is a sectional view taken along lines 10—10 of FIG. 9;

FIG. 11 is a perspective view of another form of clamping apparatus of the present invention;

FIG. 12 is a sectional view taken along lines 12—12 of FIG. 11;

FIG. 13 is a perspective view of clamping apparatus shown in FIG. 11 with a shim;

FIG. 14 is a perspective view of the shim used in FIG. 13.

DETAILED DESCRIPTION

Referring now to the drawings in FIG. 1 there is shown a movable support 15 in the form of a transverse tool bar which may be supported by the three point hitch of a tractor or like vehicle to be moved along a crop row. A tool assembly 16 is supported for movement with movable support 15. Assembly 16 is of the type disclosed in the above-mentioned U.S. Pat. No. 4,585,073 and generally includes a horizontally supported, soil-penetrating disk 17 on a vertical shaft 18 which in turn is connected to an upper shank 19. Shank 19 has a rectangular cross section and is of a uniform dimension along its length.

The apparatus shown for securing the shank 19 to the tool bar 15 includes a clamping device 21 extending transversely through aligned apertures in the free end portions of a pair of spaced clamping members 22 and 23. The spaced clamping members 22 and 23 shown are a part of a unitary clamp body 25 which has a transverse end wall 26 portion connecting the pair of clamping members at adjacent ends and providing a stop for the shank. There is an open slot 27 formed by the free end portions of members 22 and 23 through which the shank will freely slide before the clamping device 21 is inserted. The clamp body then forms a slot complementary in shape with the shank with the slot being only slightly larger than the shank so the shank will freely slide up and down therein until the clamping forces described hereinafter are applied. The slot is open at the bottom and top. The transverse end wall 26 is provided with a laterally extending V-shaped recess 28 opposite the stop for the shank that is complementary in shape to and fits over a portion of the tool bar 15 which is of square cross-section and oriented with corners facing up, down, front and rear. This arrangement is commonly referred to as a diamond tool bar.

A clamping bracket 31 with a laterally extending V-shaped recess 32 and a pair of bolts 33 that extend through holes in the bracket and into internally threaded holes in the clamp body 25 secure the clamp body 25 to the tool bar 15 while allowing the clamp body 25 to be positioned at any point along the tool bar. The recess 32 of the bracket fits over a portion of the corner of the tool bar opposite recess 28.

The clamping device 21 includes an elongated body 30 of generally circular cross sections having axially spaced shaft sections 35 and 36 with a common center C1 coaxially arranged along a common longitudinal axis A for the body 30. The shaft sections 35 and 36 shown have the same external diameter. A hexagonal head 37 is provided on one end of the body and the body has external threads 38 on an end portion opposite head 37. A flanged nut 41 threads on the threads for applying clamping forces to the clamping members 22 and 23 when the nut is tightened. A star washer 42 is shown disposed between the head 37 and clamping member 22.

The body 30 further has an eccentric section 43 disposed between shaft sections 35 and 36 which has a center C2 offset or displaced from the center C1 of the sections 35 and 36 and further is smaller in size than the shaft sections to form a channel-shaped notch or recess 45 along one side of the body between sections 35 and 36 into which an end portion of the shank 19 may be slidably received.

The eccentric section 43 shown has a circular cross section of a diameter less than the diameter of shaft sections 35 and 36. A typical clamping device 21 will have an eccentric section with a diameter of ½ inch and sections 35 and 36 have a diameter of ⅝ inch so the offset distance is ⅛ inch.

The recess 45 allows the shank to slide freely up and down therein to set the tool at the desired elevation when the eccentric section 43 is in the release position as shown in dashed lines in FIG. 5. The eccentric section 43 is moved from the release position to the locking position by rotating the eccentric section through an angle of about 90° counter-clockwise as shown in FIG. 5 and designated by angle B to apply a clamping force to the shank in a direction transverse to the axis of body 30. This is done preferably by using a wrench on head 37. The nut 41 is then tightened to apply the clamping forces to members 22 and 23 along the bolt body.

The eccentric section 43 as shown is self locking in that the forces applied to the shank during use are in the upward direction along the shank and this tends to further apply clamping forces against the end of the shank. The eccentric section 43 also acts as a lock for the head so that only one wrench and one man is required to perform the clamping of the shank at a selected elevation.

To adjust the elevation of the shank 19 and thereby tool 17 the nut 41 is backed off and the eccentric section 43 is backed off by using a wrench on the head 37, the shank is slid up or down on the body 25 and the eccentric section then rotated back to the locking position and nut 41 tightened. In view of the range of movement of the eccentric section a high degree of accuracy in machining is not required.

An alternative eccentric section 43a shown in FIG. 8 is of a generally elliptical shape. This shape 43a has the radius R from the center of the offset section C2' the same as the radius R of the shaft sections 35 and 36 so that the mass of the eccentric section is maximum in forming a recess along one side of the bolt body. The radius of the eccentric section is also the same as the radius of the shaft sections opposite the recess in the body. The body is rotated approximately 45 degrees designated B' to exert the clamping force.

Referring now to FIGS. 9 and 10 there is shown another form of clamping apparatus which includes a pair of spaced clamping members 52 and 53 in the form of flat metal plates connected by a transverse spacer bar 54 as by welding. The spacer bar also serves as a stop for the shank 19 which is disposed between the clamping members.

A pair of vertically spaced clamping devices 21 extend through aligned apertures in the free end portions of the clamping members 52 and 53 which serve to clamp the shank 19 between the clamping members in the same manner as above described. The clamping devices 21 are spaced an equal distance above and below the midpoint of spacer bar 54.

An upper transverse pin 57 extends between the members 52 and 53 and passes through the eyelet of an upper eyebolt 58 having external threads on an opposite end portion. A lower transverse pin 61 extends between members 52 and 53 and passes through the eyelet of a lower eyebolt 62 having external threads. Preferably the pins are removable as by using a groove at each end and a locking washer so eyebolts different lengths can be used according to the size of the tool bar to which it is clamped. A transverse angle iron 63 is shown secured in V-shaped notches in members 52 and 53 and extends between the eyebolts to clamp to the diamond tool bar. If square or rectangular tool bars are being clamped to then a U-shaped channel of the appropriate size would be fastened to the plates in place of the angle iron 63.

A clamping bracket 65 with a V-shaped recess 66 has spaced apertures that receive the threaded end portions of the eyebolts and enable the bracket to clamp against the tool bar 15 to secure the clamping plates to the tool bar at any position along the tool bar. A nut 67 is threaded on each eyebolt to clamp the clamping members to the support member 15.

This construction provides interchangability of eyebolts allowing the spaced clamping members 52 and 53 to be secured to movable transverse tool bars of different shapes other than the diamond, and different sizes of square and rectangular shapes. For example, the tool bars may be square, diamond or rectangular and may have different dimensions. Typical dimensions that could be accommodated are diamond, 2 and ¼ inches by 2 and ¼ inches; square, 4 inches by 4 inches and 7 inches by 7 inches; rectangle 4 inches by 6 inches in either direction, and 5 inches by 7 inches in either direction.

The clamping apparatus shown in FIG. 11 and 12 is an integral part of a cultivator frame of the type shown in the above mentioned copending application. The cultivator frame includes a longitudinally extending tube 68 of rectangular or square cross section having a transverse end plate 69 along the end of the tube. A pair of spaced clamping members 72 and 73 in the form of flat plates are affixed at one end to the end plate 69 as by welding and top and bottom gussets 75 and 76 respectfully, further secure the members 72 and 73 to the end plate. A pair of clamping devices 21 extend through aligned apertures in the free end portions of the plates to provide the clamping of the shank 19 to the cultivator frame in the same manner above described.

To accommodate shanks of a smaller size for the cultivator clamp shown in FIGS. 11 and 12 there is provided an insertable shim 79. This shim 79 comprises a pair of spaced plates 81 and 82 connected at one end by a spacer bar 83. This shim 79 is inserted between the clamping members 72 and 73 to form a smaller slot for a smaller shank 19a. Each of the spaced plates 81 and 82 have an upper slot 85 and lower slot 86 through which the clamping devices 21 extend which serve to locate the shim 79 in place in the slot. The clamping devices 21 are applied in the same manner as described above to clamp the shank in place. The clamp without the shim would accommodate a shank of 1 inch by 3 inches while with the shim would accommodate a shank of ¾ inch by 2 and ½ inches.

Although the present invention has been described with a certain degree of particularity, it is understood that the present disclosure has been made by way of example and that changes in details of structure may be made without departing from the spirit thereof.

What is claimed is:

1. In a clamping apparatus, the combination comprising an element disposed between a pair of spaced clamping members having free end portions and a transverse stop between said members opposite said free end portions;

a clamping device including an elongated one piece body extending through said free end portions, said body having a pair of axially spaced shaft sections with a common center, said body having a head at one end and external threads on an opposite end portion with a nut threaded on the threads for applying a first clamping force directed along the longitudinal axis of said body which first clamping force through said head and nut provides a pair of opposite inwardly directed clamping forces to said pair of spaced clamping members; and an eccentric section between said shaft sections having a center offset from the center of said shaft sections for applying a second clamping force directed substantially perpendicular to the longitudinal axis of said body to move said element against said stop in a direction substantially perpendicular to said first clamping force upon the rotation of said body from a release position to a clamping position to provide a second pair of opposite inwardly directed clamping forces to said element, said eccentric section being integral with said shaft sections and head for holding said body against rotation in said clamping position to enable said nut to be rotated to change said first clamping forces and said eccentric section to be rotated by the rotation of said head for the selective changing of said second clamping forces, said shaft sections being provided by a bolt shaped body having a substantially uniform diameter and having a generally circular cross section, said eccentric section being provided by having a recessed surface in a side of said body between said shaft sections into which an end portion of said element will slide when said eccentric section is in a release position, said eccentric section being generally smaller than said shaft sections and having an external surface opposite said recessed surface that is the same radius as said shaft sections.

2. A clamping device as set forth in claim 1 wherein said eccentric section is of an elliptical shape.

3. A clamping device as set forth in claim 1 wherein said eccentric section has a generally circular cross section.

4. A clamping device as set forth in claim 1 wherein said eccentric section has a generally eccentric cross section.

5. In clamping apparatus, the combination comprising:

a pair of spaced clamping members having free end portions and a transverse stop, an element disposed between said clamping members, and at least one clamping device including an elongated one piece body extending through said free end portions, said body having axially spaced shaft sections supported for rotation by said free end portions, said body having a head at one end and external threads on an opposite end portion with a nut threaded on said threads for applying a first clamping force directed along the longitudinal axis of said body which first clamping force through said head and nut provide a pair of opposite inwardly directed clamping forces to draw said clamping members against said element between said members, and an eccentric section between said shaft sections movable between a release position and a clamping position for applying a second clamping force directed substantially perpendicular to the longitudinal axis of said body to move said element against said stop in a direction substantially perpendicular to said first clamping force to provide a second pair of opposite inwardly directed clamping forces to said element, said eccentric section being integral with said shaft sections and head for holding said body against rotation in said clamping position to enable said nut to be rotated to change said first clamping forces and said eccentric section to be rotated by the rotation of said head for the selective changing of said second clamping forces, said shaft sections being provided by a bolt shaped body having a substantially uniform diameter and having a generally circular cross section, said eccentric section being provided by having a recessed surface in a side of said body between said shaft sections into which an end portion of said element will slide when said eccentric section is in a release position, said eccentric section being generally smaller than said shaft sections and having an external surface opposite said recessed surface that is the same radius as said shaft sections.

6. In clamping apparatus as set forth in claim 5 wherein said element is in the form of a shank having opposed flat sides, and opposed flat ends along a length of uniform dimension.

7. In clamping apparatus as set forth in claim 5 wherein a pair of said clamping devices are spaced one above the other to engage the element at two vertically spaced positions.

8. In clamping apparatus as set forth in claim 7 where said clamping devices are equal distances above and below the midpoint of said stop.

9. In clamping apparatus as set forth in claim 5 wherein said clamping members are in the form of flat-sided plates each affixed at one end to the end plate of a tubular longitudinal support frame adapted to move along a crop row.

10. In clamping apparatus as set forth in claim 5 wherein said clamping members are in the form of flat-sided plates each having an end portion opposite said free end portions adapted to fit over a portion of the cross section of a transverse tool bar.

11. In clamping apparatus as set forth in claim 10 including a pair of spaced removable transverse pins extending between said clamping members each supporting an eyebolt for fastening said clamping members to a movable support.

12. In clamping apparatus as set forth in claim 10 including a transverse connecting member connected between said clamping members opposite said free end portions adapted to fit over a portion of said tool bar.

13. In clamping apparatus as set forth in claim 5 including a shim between said clamping members, said shim having a pair of side plates and a spacer at one of its ends between said plates, said shim being sized to slide fit between said clamping members and said stop to define a smaller receiving slot to receive a smaller shank in a snug-fitting relationship.

14. In clamping apparatus as set forth in claim 13 including locator slots in said side plates through which said clamping devices extend.

15. In clamping apparatus, the combination comprising:
a pair of spaced flat-sided clamping plates having free end portions and an opposite transverse stop, and
a pair of spaced clamping devices extending through the free end portions, each said clamping device including an elongated one piece body having axially spaced shaft sections supported for rotation by said free end portions, said body having a head at one end and external threads on an opposite end portion with a nut threaded on said threads for applying a first clamping force directed along the longitudinal axis of said body which first clamping force through said head and nut provide a pair of opposite inwardly directed clamping forces to force said free end portions of said clamping plates, said free end portions bearing against the sides of a shank between said plates, and an eccentric section between said shaft sections movable between a release position and a clamping position for applying a second clamping force directed substantially perpendicular to the longitudinal axis of said body to move said shank against said stop, said eccentric section being integral with said shaft sections and head for holding said body against rotation in said clamping position to enable said nut to be rotated to change said first clamping forces and said eccentric section to be rotated by the rotation of said head for the selective changing of said second clamping forces, said shaft sections being provided by a bolt shaped body having a substantially uniform diameter and having a generally circular cross section, said eccentric section being provided by having a recessed surface in a side of said body between said shaft sections into which an end portion of said shank will slide when said eccentric section is in a release position, said eccentric section being generally smaller than said shaft sections and having an external surface opposite said recessed surface that is the same radius as said shaft sections, and
detachable bolts supported between said plates opposite said free end portions for clamping said plates to a movable support, and
a transverse connecting member between said bolts for engaging said movable support, said connecting member cooperating with connecting means for clamping said plates to said movable support.

* * * * *